July 19, 1932.  A. D. R. TUCKER  1,867,785

MEANS FOR TRANSFERRING BOTTLES FROM BOTTLE FORMING MACHINES

Filed July 8, 1931  4 Sheets-Sheet 1

INVENTOR
ARTHUR D. R. TUCKER
BY
ATTORNEYS

July 19, 1932.   A. D. R. TUCKER   1,867,785
MEANS FOR TRANSFERRING BOTTLES FROM BOTTLE FORMING MACHINES
Filed July 8, 1931   4 Sheets-Sheet 2

INVENTOR
ARTHUR D. R. TUCKER
BY
ATTORNEYS

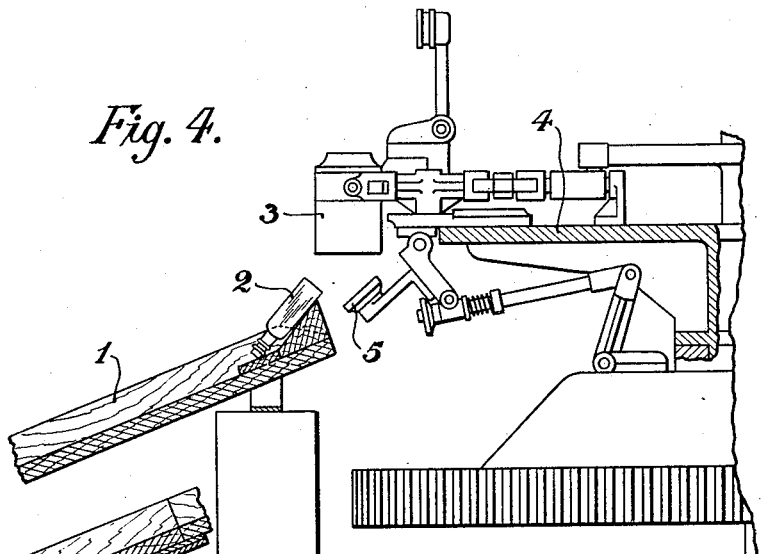
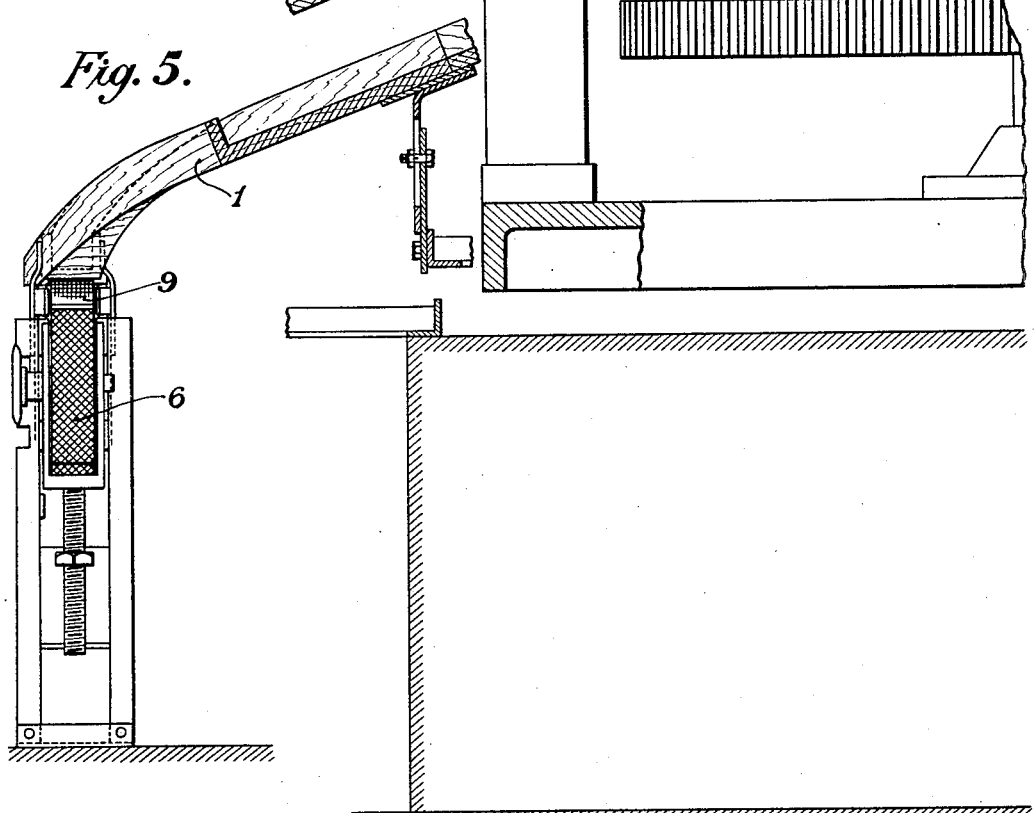

Patented July 19, 1932

1,867,785

UNITED STATES PATENT OFFICE

ARTHUR DOWRICK RICHARD TUCKER, OF OLDBURY, ENGLAND, ASSIGNOR TO ALBION BOTTLE COMPANY LIMITED, OF OLDBURY, ENGLAND

MEANS FOR TRANSFERRING BOTTLES FROM BOTTLE-FORMING MACHINES

Application filed July 8, 1931, Serial No. 549,385, and in Great Britain November 1, 1930.

This invention relates to means for delivering or transferring glass or other bottles from bottle-forming machines, and particularly from forming machines of the rotary type wherein a revolving table carries the forming moulds which are successively opened to throw out or eject the finished bottles.

The object of the present invention is to provide simple but efficient means for transferring or delivering the bottles from the forming machine in a convenient manner for subsequent treatment or handling, such as for loading or stacking in an annealing lehr.

Usually the finished bottles are discharged from a rotary forming machine on to a chute down which they travel neck foremost, and the bottles delivered by the chute have been picked up by a hand appliance and placed in an upright position upon a conveyor belt at spaced distances apart thereon conveniently for being removed by gripping devices, of a stacker or transporting apparatus which transfers the bottles into a lehr. The present invention provides for this operation to be done automatically, that is to say, the bottles ejected by the forming machine can be automatically delivered to and placed upon the conveyor belt in an upright position at definite distances apart, conveniently for being removed therefrom, such as by a lehr-loading appliance.

According to the invention, the transferring or delivery means comprises a chute for receiving in succession the bottles, neck foremost, as they are ejected from the forming machine, a device which receives the bottles from the chute and reverses their direction of travel, and an angularly-moving raising or tipping device which receives the successive bottles, turns them into upright positions with the bottoms downwards, and transfers them in such positions on to a conveyor at definite distances apart. The device for reversing the direction of travel of the bottles preferably consists of a moving conveyor band or the like, on to which the bottles are caused to fall after passing down the chute from the forming machine, the conveyor band carrying the bottles bottom foremost to the angularly-movable raising or tipping device; or, according to a modification, the bottles may be delivered from the chute on to a second but reversed chute, instead of on to a conveyor band, the said second chute reversing the direction of travel of the bottles and delivering them to the raising or tipping device.

The bottle tipping or raising device may be automatically and intermittently operated by any suitable means so as to work in synchronism with the discharge of the bottles from the forming machine.

Figure 1 of the accompanying drawings is a plan of bottle delivering or transferring means in accordance with the present invention.

Figure 4 is a longitudinal section through the upper part of the delivery chute from the forming machine, a portion of the latter being shown in sectional elevation.

Figure 5 is a continuation of Figure 4, and shows the lower part of the chute and the primary conveyor on to which the bottles are delivered from the chute.

In carrying out one form of the invention, as shown in Figures 1 to 6 an inclined wooden chute 1 is provided, the upper end of which is positioned to receive the bottles 2 in succession as they are discharged at definite intervals from the moulds 3 carried by the revolving table 4 of the rotary forming machine, the said bottles travelling down the chute with their necks foremost. The forming machine indicated is of a known type wherein the moulds 3 open as they come into position over the chute, and have separate bottom parts 5 (Figure 4) which are lowered and tilted as the moulds open, in order to discharge the bottles on to the chute.

Figure 2:
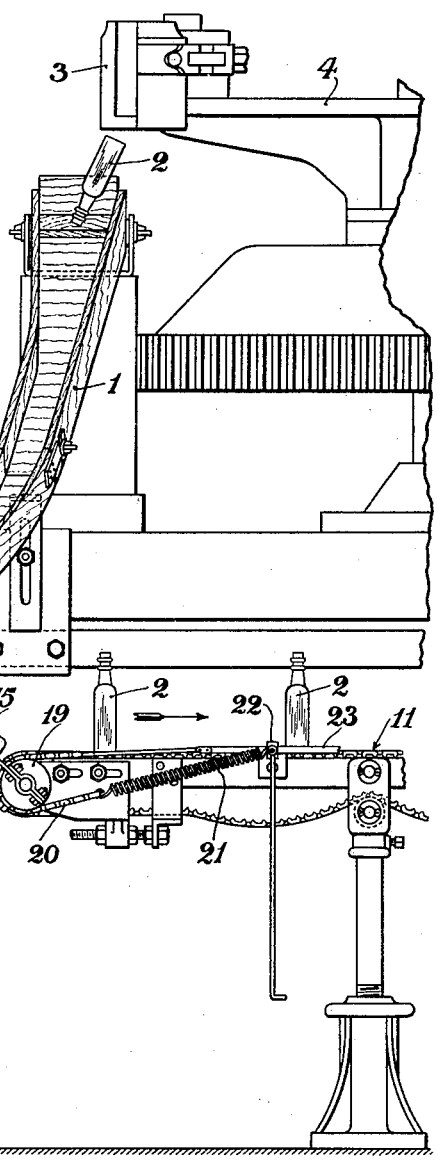
Figure 2 is a side elevation of a portion of the mechanism.
Figure 6:
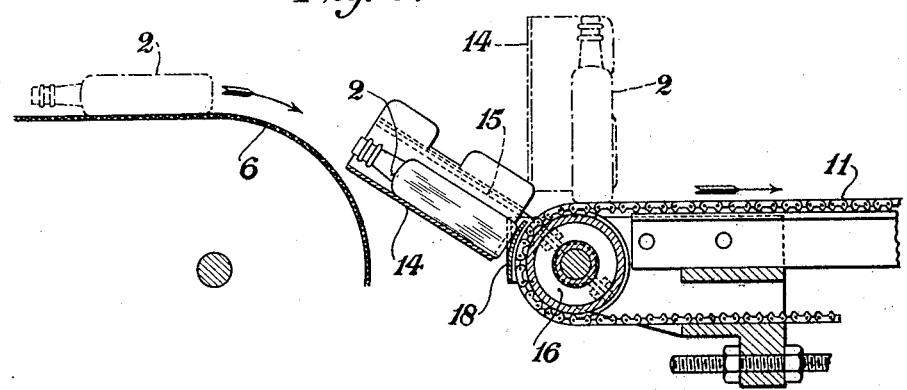
Figure 6 is a longitudinal section through the bottle tipper or raising device employed between the two conveyors.

The lower or discharge portion of the said chute 1 is curved laterally as shown, or may be disposed in any position, so as to deliver the bottles 2 in any desired direction and in a more or less horizontal position. Disposed beneath the delivery end of the chute and in substantially the same vertical plane as the said end, is a conveyor belt 6 having an asbestos facing upon which the bottles are received. This conveyor belt 6 runs around suitable drums or pulleys (one of which is shown at 7) on horizontal axes, and is driven in a direction such that the top side of the belt travels in a direction opposite to the direction of travel of the bottles as they leave the chute 1. The said top side of the belt is situated at a suitable distance below the extremity of the chute, at least equal to the width of a bottle body so as to allow of the bottles being carried under the chute when deposited upon the conveyor. Suitable fixed side guards or vertical flanges 8 are provided at opposite sides of the top side of the belt to form a channel for receiving the bottles, and across these side guards or flanges a suitable buffer device 9 is provided at a convenient distance beyond the end of the chute for the purpose of arresting the forward or neck-foremost motion of the bottles as they are received on the conveyor. This buffer 9 may, for example, consist of a depending flap of stout asbestos cloth carried by a fixed bridge 10. Thus, as each bottle leaves the chute 1 it is projected on to the conveyor belt 6 in a horizontal position and its neck end strikes the buffer 9, which checks its forward motion and brings the bottle to rest. Immediately its direction of motion is reversed and it is carried forward by the conveyor 6 with its bottom foremost. It is carried in this manner beneath the chute 1 to the forward end of the conveyor 6, and by means of the device to be described is transferred to a second or delivery conveyor belt 11 upon which it is carried in an upright position to be seized by the grippers 12 of a stacking or loading machine 13 which transfers it on to the conveyor 32 passing into the lehr 33 (see Figures 2 and 3). This delivery conveyor belt 11 is disposed in the same vertical plane as the primary or reversing conveyor 6, but at slightly lower level, and there is a gap between the two conveyors which is bridged by an intermittently oscillating bottle transferring or tipper device which receives each bottle from the first conveyor 6, turns or raises it into a vertical position, and places it in this position upon the delivery conveyor 11. This bottle transferring or tipper device consists of an open-ended channel-sectioned tray 14 carried in a more or less radial position upon the end of an arm 15 adapted to turn about the axis of the rear drum or pulley 16 of the delivery conveyor 11. The transfer or tipper 14 is intermittently moved angularly in synchronism with the discharge of the bottles from the forming machine, such that, as each bottle reaches the forward end of the reversing or primary conveyor 6, the said tray takes a slightly inclined position with its outer end adjacent the said conveyor 6 so as to receive each bottle in turn from the conveyor. The open inner end of the transfer tray or tipper 14 moves closely over a curved fixed guard plate 18 (Figure 6) surrounding the rear end of the delivery conveyor belt 11 where it passes around the drum 16, and as each bottle is received in the tray 14 it comes to rest with its bottom against the said guard plate. By means of suitable mechanism the transfer tray 14 is, at the right moment, turned angularly and raised into a vertical position, as shown by dotted lines in Figure 6, carrying the bottle 2 with it over the guard plate 18 until it is deposited, in a vertical position with the bottom downwards, upon the delivery conveyor belt 11. The latter then carries it forward while the transfer tray or tipper 14 returns to receive the next bottle from the reversing conveyor 6. Successive bottles are in this manner deposited upon the delivery conveyor all in an upright position and at equal distances apart, as shown in Figures 2 and 3.

The transfer tray or tipper 14 may conveniently be operated by a suitable moving part of the lehr stacker or loader 13 which is of known construction and is itself synchronised with the bottle-forming machine. Thus, the arm 15 of the tray 14 may be carried by a sprocket wheel or pulley 19 engaged by a chain 20 the lower end of which is connected through a tension spring 21 to a fixed anchorage at 22, while the upper end of the chain is connected to a longitudinally sliding rod 23 connected at its forward end, near to where the conveyor 11 passes beneath the transfer arms 24 of the lehr stacker, to another chain 25 connected to a sprocket wheel or pulley 26 on the conveyor frame. Around this wheel 26 is a chain 27 which passes over sprockets 28, 29, on the stacker frame and is connected to a lever 30 operated from a cam 31 included in the stacker mechanism, so that, at the proper moment, the longitudinal rod 23 is drawn forwards, thereby turning the sprocket wheel or pulley 19 of the transfer tray or tipper 14, lifting the latter into a vertical position to deposit a bottle on the delivery conveyor 11, and tensioning the anchorage spring 21. The said spring is then allowed to function so as to return the transfer tray to its bottle-receiving position.

Instead of the transfer tray 14 being operated from the lehr-stacker, it may be operated and timed from the bottle-forming machine itself. It may, for example, be actuated by the piston of a compressed-air cylinder into which compressed air is admitted under the control of the forming machine so that the tray shall operate in synchronism with the discharge of the bottles from the said machine.

Figure 1:
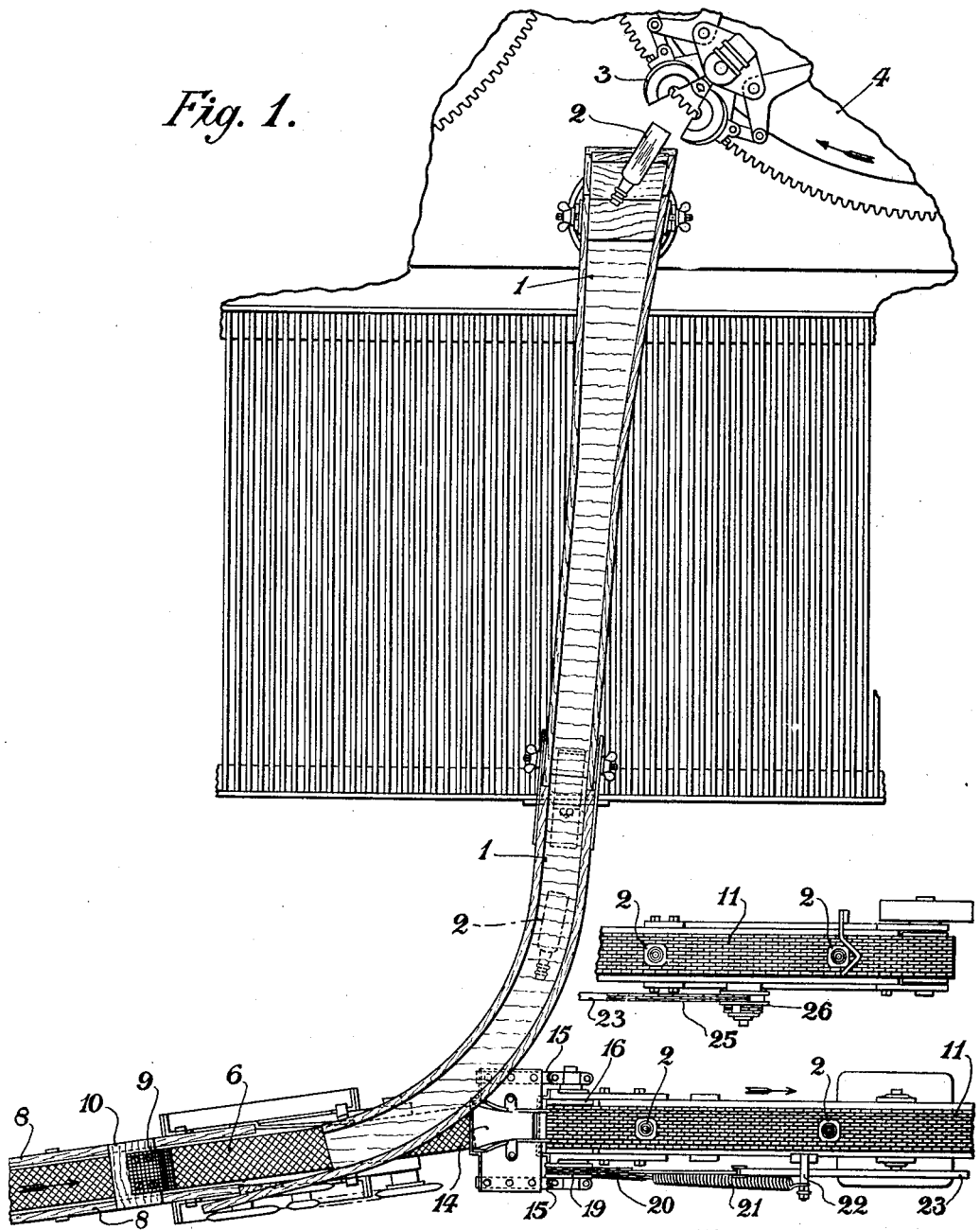
Figure 3:
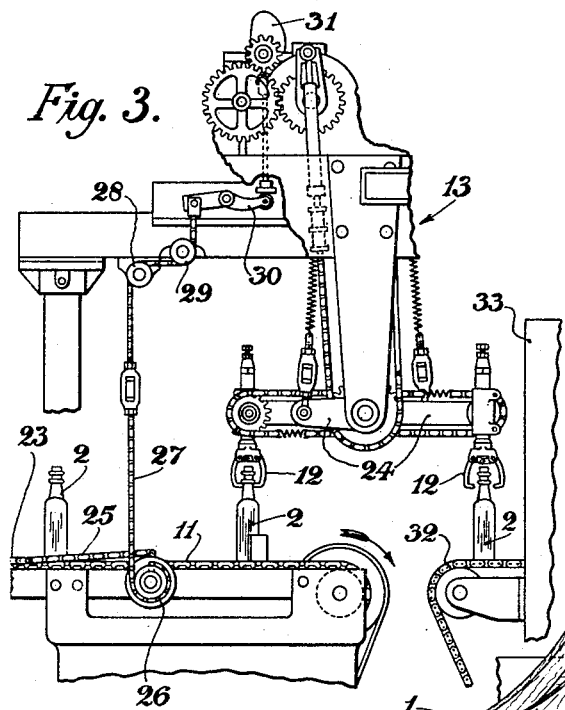
Figure 3 is a side elevation of the remaining portion of the mechanism, being a continuation of Figure 2.

The bottles 2, being carried along the delivery conveyor in an upright position and at equal distances apart, can conveniently be seized and lifted off by the gripping devices 12 on the swinging transfer arms 24 of the lehr-stacker in the known manner and thereby deposited upon the conveyor 32 which carries it into the lehr 33 (see Figure 3).

Figure 7:
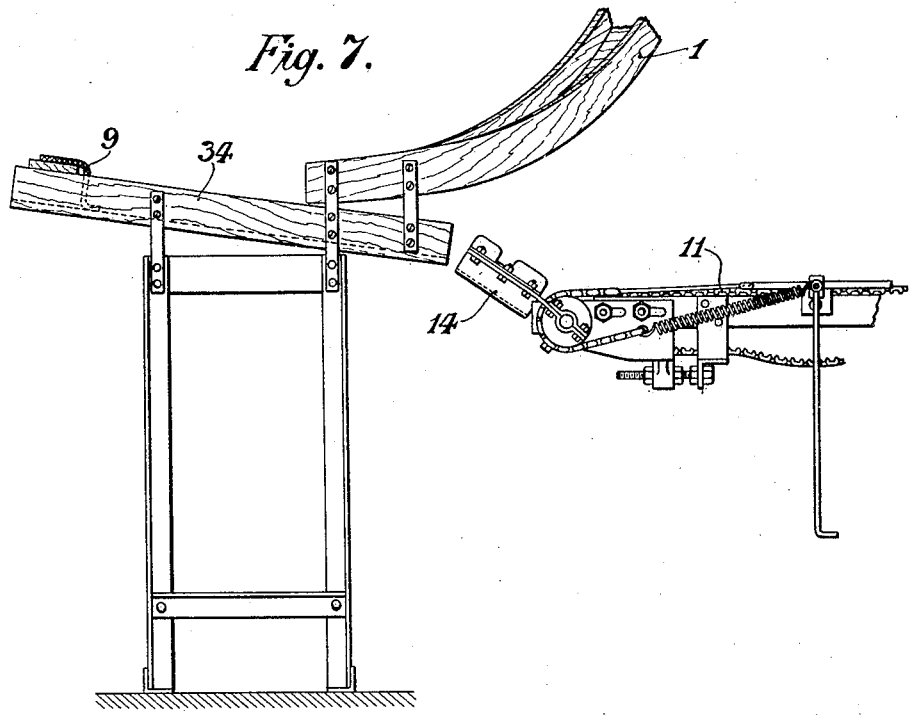
Figure 7 illustrates a modification.

In the modification shown in Figure 7, instead of the bottles 2 being reversed in their direction of travel, when they leave the chute, by means of a primary conveyor, they may be discharged from the chute 1 leading from the forming machine, on to a second but reversely-inclined chute 34 up which they travel nose foremost for a certain distance until they engage a buffer 9, when they slide backwards bottom foremost down the said second chute 34, under the end of the first chute 1, and then on to the transfer tray 14 by which they are deposited in a vertical position upon the delivery conveyor 11 as previously described.

Having fully described my invention, what I desire to claim and secure by Letters Patent is:—

1. Means for transferring bottles from a bottle-forming machine, comprising a chute on to which the bottles are discharged in succession from the forming machine and down which they travel by gravity in a neck-foremost position said chute having its delivery end disposed so as to deliver the bottles neck-foremost in a substantially horizontal direction, a moving conveyor disposed beneath the said delivery end of the chute and movable in a direction opposite to that in which the bottles leave the chute, a buffer device above the conveyor which brings the bottles to rest on the conveyor and causes them to be carried forward on their side bottom foremost, an angularly-movable tipping device on to which the successive bottles are delivered on their side by the conveyor, a delivery conveyor, and means for actuating the tipping device to cause the bottles to be raised into an upright position bottom downwards and transferred on to the delivery conveyor in such upright position at definite distances apart.

2. Means for transferring bottles from a bottle-forming machine, comprising a chute on to which the bottles are discharged in succession from the forming machine and down which they travel by gravity in a neck-foremost position, said chute having its delivery end disposed so as to deliver the bottles neck-foremost in a substantially horizontal direction, a continuously moving endless-belt bottle reversing conveyor disposed beneath said delivery end of the chute and movable in a direction such that its top side travels in a direction opposite to that in which the bottles leave the chute, said conveyor causing the bottles to be carried forward on their side bottom foremost, an angularly-movable tipping device on to which the successive bottles are delivered on their side by reversing conveyor, said tipping device normally taking a position to receive the bottles from the said conveyor, an endless-belt delivery conveyor moving in the plane of movement of, and having one end adjacent to said tipping device, and means for intermittently raising the tipping device, to cause the bottles received therein to be transferred in an upright position bottom downwards on to the delivery conveyor at definite distances apart thereon.

3. Means for transferring bottles from a bottle-forming machine, comprising a chute on to which the bottles are discharged in succession from the forming machine and down which they travel by gravity in a neck-foremost position, a device receiving the bottles from the said chute and which reverses their direction of travel, a continuously-moving endless-bent delivery conveyor, drums for moving said conveyor, an oscillatory tipping device normally taking a position to receive successive bottles from the reversing device bottom foremost, said tipping device being movable in the same vertical plane as and adjacent one end of the delivery conveyor and being mounted for turning about the axis of one of the drums of said conveyor, and means for intermittently raising the tipping device to cause the bottles received therein to be transferred in an upright position bottom downwards on to the delivery conveyor at definite distances apart thereon.

4. The combination with a bottle-forming machine, of a chute on to which the bottles are discharged in succession from the forming machine and down which they travel by gravity in a neck-foremost position, a device receiving the bottles from the said chute and which reverses their direction of travel, a continuously-moving delivery conveyor, drums for moving said conveyor, an oscillatory tipping device normally taking a position to receive successive bottles from the reversing device bottom foremost, said tipping device being pivoted to turn about the axis of one of the drums of the delivery conveyor and move adjacent the end of said conveyor, a lehr stacker for transferring bottles from the delivery conveyor into a lehr, and means operated by a moving part of the lehr-stacker for intermittently raising the tipping device to cause the bottles received by the said device to be raised into an upright position bottom downwards and to be transferred on to the delivery conveyor bottom downward at definite distances apart.

5. The combination with a bottle-forming machine, of a chute on to which the bottles are discharged in succession from the forming machine and down which they travel by gravity in a neck-foremost position, an endless-belt bottle reversing conveyor on to which the bottles are delivered from the chute and which carries them bottom foremost, a continuously-moving endless-belt delivery conveyor, drums for moving said conveyor, an oscillatory tipping device pivoted to turn about the axis of one of the drums of the delivery conveyor and move adjacent the end of said conveyor, a spring acting upon the tipping device to maintain the same adjacent the reversing conveyor for receiving successive bottles therefrom, a lehr stacker for transferring bottles from the delivery conveyor into a lehr, and mechanical means operated by the lehr-stacker for intermittently raising the tipping device to cause the bottles received by the said device to be raised into an upright position bottom downwards and to be transferred on to the delivery conveyor bottom downwards at definite distances apart thereon.

In testimony whereof I have affixed my signature.

ARTHUR DOWRICK RICHARD TUCKER.